UNITED STATES PATENT OFFICE.

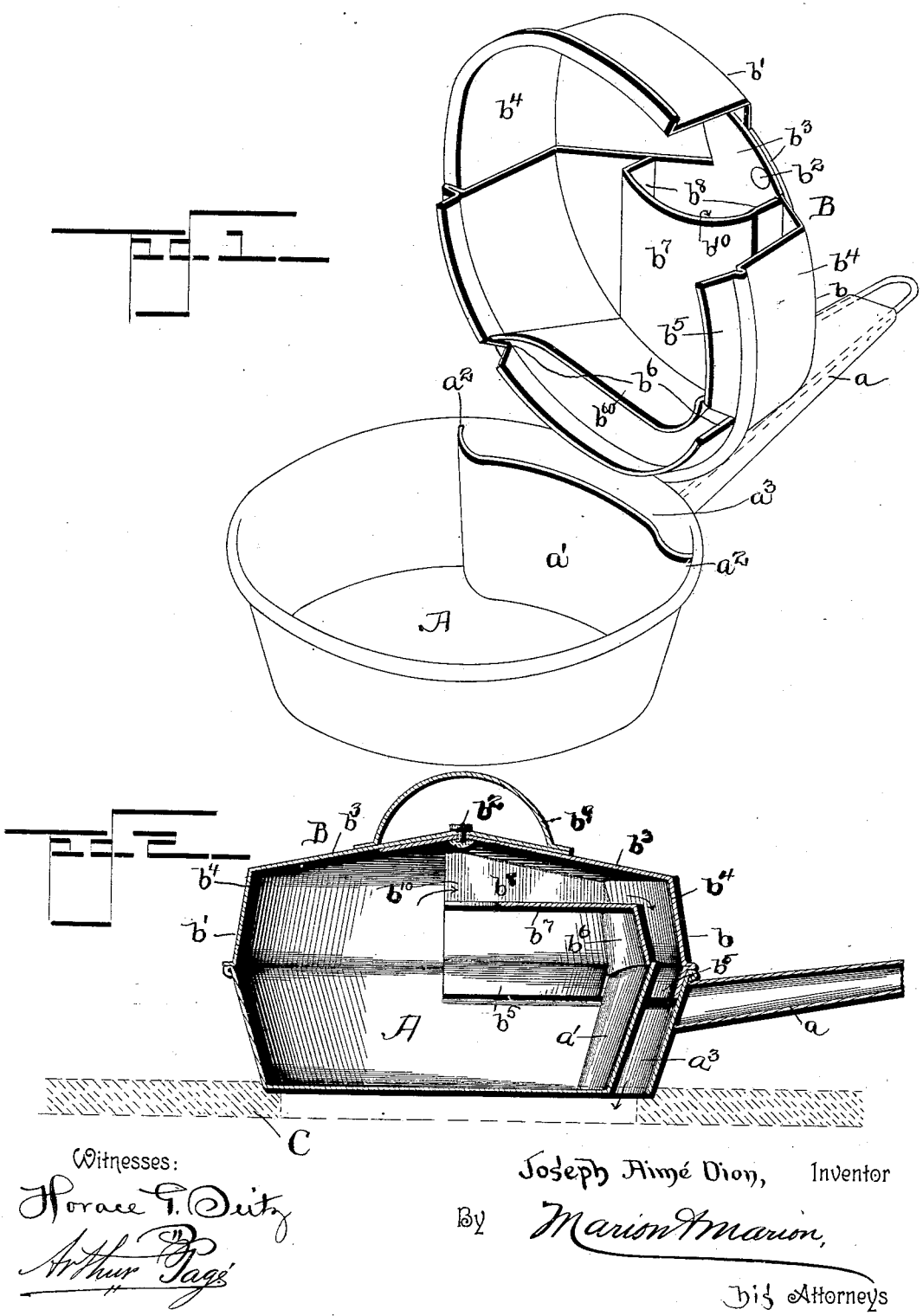

JOSEPH AIMÉ DION, OF POINT ST. CHARLES, CANADA.

COOKING UTENSIL.

SPECIFICATION forming part of Letters Patent No. 620,750, dated March 7, 1899.

Application filed January 20, 1898. Serial No. 667,192. (No model.)

*To all whom it may concern:*

Be it known that I, JOSEPH AIMÉ DION, a citizen of the Dominion of Canada, residing at Point St. Charles, in the county of Hochelaga, Province of Quebec, Canada, have invented certain new and useful Improvements in Cooking Utensils, (for which Letters Patent of the Dominion of Canada have been granted, dated April 9, 1898, No. 59,582;) and I do hereby declare the following to be a clear, full, and exact description of the invention, such as will enable others skilled in the art to which it appertains to make and use the same.

My invention relates to improvements in cooking utensils.

The object of my invention is to provide a device of this character in which the smoke and other products produced in cooking will be carried into the fire and burned or passed out through the chimney.

A further object is to provide a cooking utensil in which the contents may be inspected and turned without removing the lid, preventing the escape of the smoke, &c., into the room.

To these ends my invention consists in the improved construction and combination of parts hereinafter fully described, and particularly pointed out in the claim.

In the drawings, in which similar letters of reference indicate similar parts in both views, Figure 1 is a perspective view showing a pan provided with my improvement having its lid raised. Fig. 2 is a sectional view of the same, the lid being shown in position.

In the use of cooking utensils, and especially in the use of the frying-pan, it has been found that the smoke, &c., make a disagreeable odor throughout the house if no lid is used and when a lid is used the contents of the pan will burn. The same is true of other utensils. It has also been found that even if a lid is put on when an inspection is required the lid must be taken off, allowing of the escape of all the confined products. It is to obviate these disadvantages that the following-described invention has been provided.

A designates the cooking vessel, which for purposes of illustration is herein shown as a frying-pan. A suitable handle $a$ is secured to the pan. The pan is provided at one side with a supplemental flange $a'$, extending upward within the pan, the central portion extending to a point a slight distance above the top level of the pan. The ends $a^2$ of the flange $a'$ are secured to the side of the pan, while the bottom between the flange $a'$ and the side of the pan is cut away, thereby forming a channel $a^3$, but leaving the pan complete to be used in the ordinary manner, if desired.

B designates the lid, which is formed of the semicircular portions $b$ $b'$, which are connected together at the center of the lid by a suitable rivet $b^2$ in such manner that the portion $b'$ may rotate above the outside of the portion $b$. Each of the portions $b$ $b'$ is formed with a central flared portion $b^3$, having downwardly-extending flanges $b^4$, which are adapted to rest on the top of the pan A. Extending downwardly from the flange $b^4$ of the portion $b$ is a flange $b^5$, adapted to pass downward within the sides of the pan. This flange $b^5$ is provided with notches $b^6$ to allow it to pass downward over the ends $a^2$ of the flange $a'$. Secured within the flange $b^4$ of the portion $b$ is a flange $b^{60}$ of approximately the same shape as the flange $a'$, its lower edge being adapted when the lid is in position to pass within the upper edge of the flange $a'$, thus forming a close and tight connection between the two flanges. The flange $b^{60}$ extends upward to within a short distance of the top, where it is extended horizontally, as at $b^7$, to about the center of the lid. The sides of the horizontal portion are bent upward, as at $b^8$, and secured to the under side of the flared portion $b^3$ of the portion $b$. A handle $b^9$ is secured to the upper side of the portion $b'$. By this construction it will be apparent that a conduit or channel $b^{10}$ will be formed, extending from about the center to one side and then downward, where it joins with the channel $a^3$.

The operation of the device is obvious. When the pan is placed on the stove C, the contents are put in the pan and the lid placed thereon. Any smoke, &c., arising will pass upward, and as there is a constant draft (formed by the heat and smoke of the fire passing to the chimney) in the stove, which draft passes beneath the pan, the smoke, &c., will be drawn through the conduits $b^{10}$ $a^3$ into the fire-chamber and burned or pass outward through the chimney. When it is desired to inspect or turn the contents, the portion $b'$ is rotated a sufficient distance to allow of the entrance of a fork or other utensil, and as this opening will be small no smoke, &c., will escape, especially in view of the fact that the draft will remain constant, even though an opening be formed, the central portion being formed in such manner that the inlet to the conduit $b^{10}$ will be protected.

The advantages are thought to have been clearly set forth.

It will be apparent that the lid may be used independent of the pan.

Having thus described my invention, what I claim as new is—

A cooking utensil, comprising a pan portion having a conduit arranged at one side of its interior; and a lid portion formed of a plurality of pivotally-mounted sections, adapted to be removably placed on said pan portion, each of said sections having a downwardly-extending flange, the inner section being provided with a conduit extending from about the center of the lid on its inner side, to said flange, said conduit being continued downward along the inside of said flange and having its outlet-opening contiguous to the conduit formed in said pan, the flange of said inner section extending into and inclosing the outer portion of said pan-conduit, substantially as described.

In witness whereof I have hereunto set my hand in the presence of two witnesses.

JOSEPH AIMÉ DION.

Witnesses:
 ARTHUR PAGÉ,
 HORACE G. DEITZ.